Oct. 27, 1959     J. O. ALMEN     2,910,142

MEANS OF LUBRICATING GEARS

Filed Aug. 29, 1958

INVENTOR.
JOHN O. ALMEN
BY
ATTORNEYS

United States Patent Office 2,910,142
Patented Oct. 27, 1959

2,910,142

MEANS OF LUBRICATING GEARS

John O. Almen, Sierra Madre, Calif.

Application August 29, 1958, Serial No. 758,054

4 Claims. (Cl. 184—6)

This invention relates to means of lubricating gears, and included in the objects of this invention are:

First, to provide a means of lubricating gears wherein lubricant is directed axially between the teeth of a pair of gears and confined to the region in which the teeth are in mesh and moving in divergent directions; that is, the region in which the spaces between the meshing teeth are undergoing expansion so that the lubricant is drawn therein.

Second, to provide a means of lubricating gears wherein the surfaces of the gear teeth are completely wetted with lubricant immediately following washing operation of the teeth, thereby to effect maximum removal of heat therefrom.

Third, to provide a means of lubricating gears wherein excess lubricant is thrown by centrifugal force from the gear teeth during movement from the region in which they receive lubrication to the region of mutual engagement, whereby in the region of mutual engagement entrapment of lubrication in the contracting spaces between the gear teeth is avoided.

With the above and other objects in view, as may appear hereinafter, reference is directed to the accompanying drawings in which.

In the exercise of this invention, the application of lubricant is substantially confined to the region defined by a pair of rotating gears wherein the teeth are moving out of mesh and thus are forming cavities or chambers which are expanding so that these chambers or cavities function as pump chambers to draw fluid lubricant or coolant between the teeth.

The remaining portion of the gears are so mounted in their housing that excess lubricant is thrown therefrom by centrifugal force so that as the teeth move into engagement they are coated only with a thin film of lubricant, so that pumping and forcing of lubricant from between the teeth as the cavities defined thereby contract is virtually eliminated.

For purposes of illustration, a simple pair of gears 1 and 2 are shown. These gears are provided with teeth 3 and 4. Any of the standard tooth profiles may be employed, and the gears may be spur gears or helical gears, or herringbone gears, that is, any type of conventional gears. The essential requirement for the purpose of this invention is that the teeth, as the gears rotate, interengage to define contracting chambers 5 as they move toward the center line between the gear axes, and define expanding chambers 6 as they move beyond the center line in diverging paths.

Figure 1:
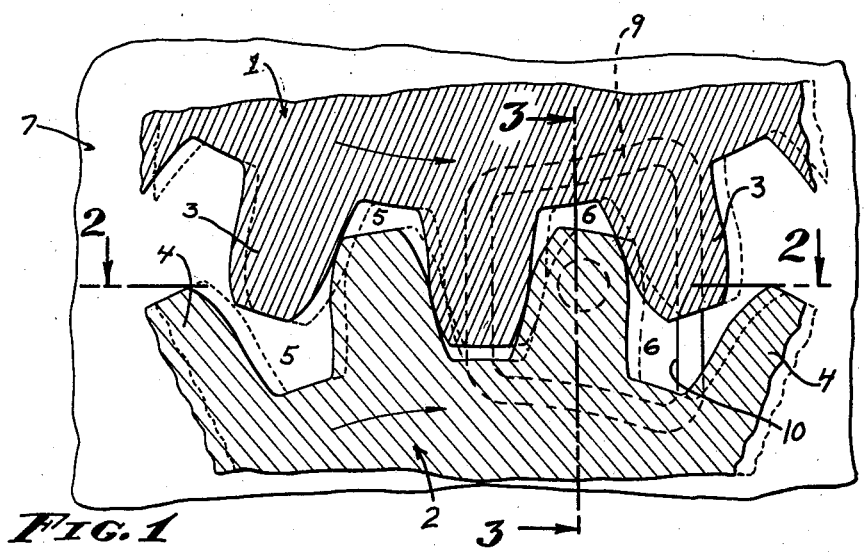
Figure 1 is an enlarged, fragmentary, sectional view taken through 1—1 of Figure 2 showing the intermeshing portions of a pair of gears, and indicating fragmentarily a portion of the enclosing housing.
Figure 2:
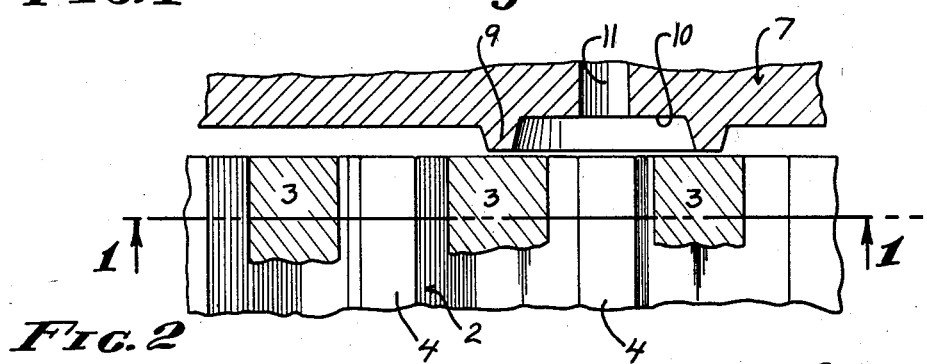
Figure 2 is a fragmentary sectional view through 2—2 of Figure 1 with the housing also shown fragmentarily.
Figures 3, 4:
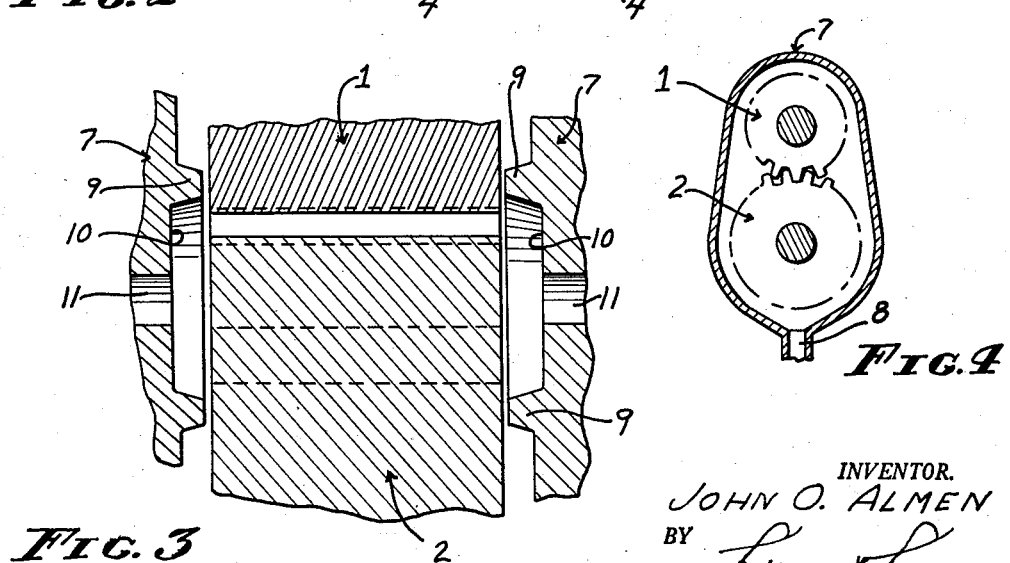
Figure 3 is a fragmentary, sectional view through 3—3 of Figure 1 with the housing also shown fragmentarily.
Figure 4 is a diagrammatical view of a pair of gears enclosed in a housing.

The gears may be mounted in a housing 7 which may be conventional in that the housing, such as the housing indicated by 7 in Figure 4, permits drainage of excess lubricant from the gears, the lubricant being discharged through an outlet 8 or collected in a sump clear of the gears.

Confronting both axial ends of the region wherein the expanding chambers 6 are formed there is provided a wall 9 which forms a cavity 10 substantially coextensive with this region. That is, the cavity begins substantially at the center line between the axes of the gears and extends in the direction of divergence of the gear teeth to approximately the point wherein the teeth move clear of interengagement. The transverse distance of the cavity corresponds approximately to the height of the gear teeth.

If the nature of the gear housing 7 permits, the wall 9 may be in the form of a rib projecting from the gear housing wall, otherwise the wall 9 may be the axial end of a tube or conduit. In any case, the cavity 10 communicates with a lubricant inlet passage 11 capable of flooding the cavity with lubricant. The walls 9 extend as closely as possible to the axial ends of the teeth 2 and 3 so that virtually the only outlet from each of the cavities 10 is into the expanding chambers 6. Lubricant can only escape therefrom when the chambers 6 become completely open as the gear teeth move out of engagement.

In the exercise of this invention, the gear teeth are lubricated as follows:

Lubricant or a coolant lubricant is supplied through the inlet passages 11 to the cavities 10. During rotation of the gears 1 and 2, the lubricant is continuously thrown into the expanding chambers 6 so that these chambers tend to be completely filled with lubricant. As soon as each chamber is open by disengagement of the gear teeth, the lubricant therein is discharged radially outward by centrifugal force.

During rotation of the gears, the teeth, as they pass from the region in which they define the expanding chambers 6 to the region in which they define the contracting chambers 5, discharge by centrifugal force all excess lubricant, so that as the teeth move into engagement and form the contracting chambers 5 only a thin film of lubricant remains. The quantity of lubricant is insufficient to fill even the minimum volume of the contracting chambers so that there is no pumping of lubricant from between the gear teeth.

Heat generated by reason of frictional contact between the gear teeth has little or no opportunity to penetrate into the teeth; for immediately upon passage of the gear teeth past the center line between the axes of the gears, the teeth define the walls of the expanding chambers 6 which become flooded with lubricant in intimate heat transfer relation with the surfaces of the teeth so that the heat is immediately transferred to the lubricant. By reason of the fact that the main body of the lubricant does not dwell on the teeth of the gears, but is immediately forced outwardly and away from the gears to the walls of the housing, the heat generated by the intermeshing of the gears is carried away.

While a particular embodiment of this invention has been shown and described, it is not intended to limit the same to the exact details of the construction set forth, and it embraces such changes, modifications, and equivalents of the parts and their formation and arrangement as come within the purview of the appended claims.

I claim:

1. A means of lubricating gears, comprising: means for restricting the introduction of fluid lubricant into that region of a pair of rotating intermeshing gears wherein the gear teeth move in diverging paths and portions therefore define expanding chambers; at least that portion of said gears leading said means being free of obstruction whereby the centrifugal force generated by rotation of said gears removes excess lubricant from said gear teeth prior to entrance of said gear teeth into that region of said gears wherein the gear teeth move into converging paths and portions thereof define contracting chambers.

2. A means for effecting the lubrication of gears, comprising: a housing enclosing a pair of intermeshing gears; means isolating from the remainder of said housing the region of said gears wherein their teeth are in mutual engagement and move in diverging paths to define expanding chambers; and means for introducing a fluid lubricant into said cavity for entrance into said expanding chambers.

3. A means for effecting the lubrication of gears, comprising: a housing enclosing a pair of intermeshing gears; means isolating from the remainder of said housing the region of said gears wherein their teeth are in mutual engagement and move in diverging paths to define expanding chambers; means for introducing a fluid lubricant into said cavity for entrance into said expanding chambers; and means for removing said lubricant from said housing whereby said gears on rotation fling excess lubricant from said gear teeth.

4. A means for lubricating gears wherein their teeth progressively define a series of contracting chambers as the teeth move into intermeshing engagement and define a series of expanding chambers as the teeth move out of intermeshing engagement, said means comprising: means defining lubricant inlets disposed at the axial ends of said expanding chambers to supply fluid lubricant for suction into said chambers as they expand; means enclosing said gears and having a lubricant outlet to receive and discharge lubricant flung from said gears as they rotate, thereby to remove excess lubricant from said teeth prior to movement of said teeth into intermeshing engagement to define contracting chambers.

References Cited in the file of this patent
UNITED STATES PATENTS 1,717,814     Strong et al. _____ June 18, 1929